United States Patent
Hodgson (10) Patent No.: US 10,184,030 B2
(45) Date of Patent: Jan. 22, 2019

(54) VINYL FUNCTIONAL INTERPENETRATING NETWORK POLYMERS PRODUCED BY PHYSICALLY MIXING VINYL FUNCTIONAL RESINS WITH THERMOPLASTIC RESIN COMPOSITIONS, METHODS OF USE AND METHODS OF PREPARATION

(71) Applicant: MIRteq Pty Limited, Warabrook NSW (AU)

(72) Inventor: Peter Clifford Hodgson, Speers Point (AU)

(73) Assignee: MIRteq Pty Ltd., Cardiff, New South Wales (AU)

( * ) Notice: Subject to any disclaimer, the term of this patent is extended or adjusted under 35 U.S.C. 154(b) by 732 days.

(21) Appl. No.: 14/427,257

(22) PCT Filed: Sep. 11, 2013

(86) PCT No.: PCT/AU2013/001034
§ 371 (c)(1),
(2) Date: Mar. 10, 2015

(87) PCT Pub. No.: WO2014/040126
PCT Pub. Date: Mar. 20, 2014

(65) Prior Publication Data
US 2015/0218320 A1 Aug. 6, 2015

Related U.S. Application Data

(60) Provisional application No. 61/699,521, filed on Sep. 11, 2012.

(51) Int. Cl.
*C08J 3/00* (2006.01)
*C08J 3/24* (2006.01)
(Continued)

(52) U.S. Cl.
CPC ............. *C08J 3/005* (2013.01); *B29C 39/003* (2013.01); *B29C 45/0001* (2013.01);
(Continued)

(58) Field of Classification Search
CPC .................. C08G 2270/00; C08J 3/005
See application file for complete search history.

(56) References Cited

U.S. PATENT DOCUMENTS 4,714,739 A * 12/1987 Arkles .................. C08G 77/42
525/101
4,870,138 A * 9/1989 Wrezel ................. C08F 283/02
525/391
6,355,735 B1 * 3/2002 Wagner ................ C08F 255/00
525/320

FOREIGN PATENT DOCUMENTS

CN 1605457 A 9/2006
EP 0632059 1/1995
(Continued)

OTHER PUBLICATIONS

International Search Report dated Nov. 20, 2013 for PCT/AU2013/001034.
(Continued)

*Primary Examiner* — Timothy Kennedy
(74) *Attorney, Agent, or Firm* — Jones Day (57) ABSTRACT

The present disclosure pertains to methods and/or systems for making a SIPN and/or an IPN by physically mixing at least one vinyl functional thermoset with at least one thermoplastic resin. For example, a method of producing a resin composition comprising: mixing at least one vinyl functional thermoset resin with at least one thermoplastic resin wherein: the two resins are sufficiently miscible at a mixing viscosity of at least at least 5,000 cPs measured at the temperature of mixing and the mixing results in sufficient laminar flow such that a substantial portion of the resin
(Continued)

mixture forms an IPN and/or a SIPN. The IPNs and/or SPINs formed have one or more superior properties over mixtures of the same resins.

19 Claims, 5 Drawing Sheets (51) Int. Cl.
  *C08L 33/12*    (2006.01)
  *B29C 39/00*    (2006.01)
  *B29C 45/00*    (2006.01)
  *C08L 67/06*    (2006.01)
  *C08L 101/02*    (2006.01)
  *B29K 25/00*    (2006.01)
  *B29K 55/02*    (2006.01)
  *B29L 31/00*    (2006.01)

(52) U.S. Cl.
  CPC ............... *C08J 3/246* (2013.01); *C08L 33/12* (2013.01); *C08L 67/06* (2013.01); *C08L 101/02* (2013.01); *B29K 2025/06* (2013.01); *B29K 2055/02* (2013.01); *B29L 2031/00* (2013.01); *C08G 2270/00* (2013.01); *C08J 2300/10* (2013.01); *C08J 2300/208* (2013.01); *C08J 2300/22* (2013.01); *C08J 2300/24* (2013.01); *C08J 2367/06* (2013.01); *C08J 2400/10* (2013.01); *C08J 2400/22* (2013.01); *C08J 2400/24* (2013.01); *C08J 2425/06* (2013.01); *C08J 2433/10* (2013.01); *C08J 2467/04* (2013.01); *C08J 2475/14* (2013.01); *C08L 2205/02* (2013.01); *C08L 2205/04* (2013.01)

(56) References Cited

FOREIGN PATENT DOCUMENTS

WO WO 2006/094404 9/2006
WO WO 2011/081546 7/2011

OTHER PUBLICATIONS

Hsiue, E.S., et al., "Dicyanate Semi-IPN Matrix Composites I—Neat Resin Properties", 30$^{th}$ National SAMPE Symposium (Mar. 19-21, 1985), pp. 1035-1041.
Official Action dated Feb. 6, 2016 in corresponding CN 201380058701.4.

* cited by examiner

VINYL FUNCTIONAL INTERPENETRATING NETWORK POLYMERS PRODUCED BY PHYSICALLY MIXING VINYL FUNCTIONAL RESINS WITH THERMOPLASTIC RESIN COMPOSITIONS, METHODS OF USE AND METHODS OF PREPARATION

CROSS REFERENCE TO RELATED APPLICATION

This application is the National Phase application of International Application No. PCT/AU2013/001034, filed Sep. 11, 2013, which designates the United States and was published in English, which further claims the benefit of priority to U.S. Application No. 61/699,521, filed Sep. 11, 2012. The foregoing related applications, in their entirety, are incorporated herein by reference. This application is further related to International PCT (Spec reference-16722207) entitled Resins, Resin/Fibre Composites, Methods of Use and Methods of Preparation, filed on Jul. 5, 2012; U.S. Provisional Application No. 61/457,916, entitled Resin/Fibre Composites, Methods of Use and Methods of Preparation, filed on Jul. 6, 2011; International Applications: PCT/AU2006/001536, filed 17 Oct. 2006; Australian Provisional Application Nos. 2005905733, filed 17 Oct. 2005; 2005906723, filed 1 Dec. 2005; 2006900511, filed 3 Feb. 2006 and 2006902791, filed 24 May 2006, each of these applications are incorporated herein by reference in their entirety.

FIELD

The present disclosure pertains to methods of making interpenetrating polymer network (IPN) compositions and/or pseudo interpenetrating network (SIPN) polymer compositions by combining, for example, selected thermoset resins and thermoplastics.

BACKGROUND

Dissolving soluble thermoplastic resins in reactive diluents and then mixing these into vinyl functional resins to reduce shrinkage is known in the art. This process however does not produce interpenetrating polymer network compositions and/or pseudo interpenetrating network polymer compositions it is simply a mixture as evidenced by the physical properties of resultant cured mass. Simply mixing two or more polymers does not create an interpenetrating polymer network (polymer blend), nor does creating a polymer network out of two or more monomers that are bonded to each other to form one polymer molecule (heteropolymer or copolymer).

For example, in making fibre glass, thermoset IPN composites, if the amount of glass required can be reduced or in certain application no glass is required then much tougher resin systems can be formulated This is because thermoset IPNs have superior elongation and much lower shrinkage than the thermosets from which they are formulated. The presence of short glass fibres in Very Short Fiber Polymerizable Liquid Composites (VSFPLC's) is useful to prevent (or reduce) crack formation during the curing process when injection moulding parts when using commercially available thermoset resins as the matrix resin. The presence of these fibres increases yield stress and modulus but reduces the elongation of the cured composite. The decrease in elongation in certain applications equates to an increase in brittleness. Glass is also used in composites to reinforce the resin during gelation and to reduce shrinkage. The presence of glass fibres is therefore typically used in vinyl functional liquid thermosets. If there was minimal shrinkage during gelation and final curing of the resin then glass fibres would not be required or may be reduced to produce serviceable moulded parts. The reduction in shrinkage and increase in elongation allows SIPN and/or IPN resins to be moulded without the need for glass reinforcement.

Disclosed in the art are composites produced with VSFPLC resin compositions. However, certain of these compositions lack sufficient toughness (as measured by the area under the stress strain curve) for certain applications. Fabricators have a need for tougher products.

One factor that influences toughness is elongation. There are resins on the market which have adequate elongation and yield stress. These resins however tend to have low heat distortion temperatures (HDT). For exterior applications it is expected that the HDT of a cured resin should be at least 80 C.

This has been achieved with certain rubber modified vinyl ester (VE) resins, but these are relatively expensive and they have limitations. For example, rubber modified VE resins may have one or more of the following issues: they stick in moulds, are expensive, shrink when cured, their HDT is limited to about 80° C. and they have minimal acceptable elongations, all of which limits their wider market acceptance.

One of the other problems with vinyl functional thermosets is that they polymerize into vitreous solids and are inherently brittle. There is a practical limit to the distance apart of the vinyl groups in the unsaturated polyester (UP) or VE molecule. This is one of the reasons why the higher the elongation (i.e. the greater the distance apart of the vinyl groups) the lower the HDT. This is caused by the lower crosslinking density and is a direct consequence of increasing the intramolecular distance between the crosslinking sites. There is a need for new vinyl functional resins in order to improve the performance of VSFPLC's and to provide commercially feasible tough serviceable resins. Certain methods and/or systems disclosed herein provide IPNs and/or SIPNs that provide commercially feasible tough serviceable resins.

The combination of polyurethane and vinyl functional resins to form various resins is known in the art. These processes involve growing the polyurethane through the vinyl functional thermoset using a chemical process, which is a chemical approach as compared with the physical processes disclosed herein. These types of resin compositions require careful storage conditions to prevent premature polymerization. Also, the required resin injection equipment involves an extra injection pump, which makes the system more difficult to use. They are not widely used because of the difficulty in controlling these systems. In addition, these systems have a high shrinkage factor which makes them more difficult to mould parts with.

Accordingly, systems, methods, resin compositions, and/or resin composites that ameliorate these and other problems disclosed in the art are desirable. The present disclosure is directed to overcome and/or ameliorate at least one of the disadvantages of the prior art, as will become apparent from the discussion herein. The present disclosure is also to provide other advantages and/or improvements as discussed herein.

SUMMARY

Certain embodiments of the present disclosure are directed to systems for and/or methods of making thermoplastics solutions in vinyl functional monomers and/or polymers with the aim of maximizing the solids content of the solution.

Certain embodiments of the present disclosure are directed to systems for and/or methods of making IPN compositions and/or SIPN polymer compositions by physically mixing a vinyl functional thermoset with a thermoplastic resin solution under laminar flow conditions in the mixer until sufficient interpenetration occurs.

Certain embodiments are to methods of producing a resin composition by mixing at least one vinyl functional thermoset resin with at least one thermoplastic resin solution wherein the two resins are sufficiently miscible when the mixture has a viscosity during mixing of at least 5,000 cPs (preferably 10,000 cPs to 50,000 cPs), measured at the temperature of mixing, so that the two resins are capable of forming an IPN and/or a SIPN. The mixing is continued sufficient interpenetration occurs. In certain aspects, the methods further comprise the substantial formation of an IPN and/or a SIPN upon sufficient mixing. In certain applications, the Reynolds number in the mixer during mixing may be below 2100. In certain applications, the Reynolds number in the mixer during mixing may be below 2000, 1500, 1000, 500, 200, 100, 50, 30, 20, or 10 to ensure sufficient laminar flow.

Certain embodiments are to methods of producing a resin composition by mixing at least one vinyl functional thermoset resin with at least one thermoplastic resin wherein the two resins are sufficiently miscible at a mixing viscosity of at least 5,000 cPs, measured at the temperature of mixing, and when there is sufficient laminar flow through mixing the two resins substantially form an IPN and/or a SIPN.

Certain embodiments are to methods of producing a resin composition by mixing at least one vinyl functional thermoset resin with at least one thermoplastic resin wherein: the two resins are sufficiently miscible at a mixing viscosity of at least 5,000 cPs, measured at the temperature of mixing, and when there is sufficient laminar flow through mixing the two resins form an IPN resin composition and/or a SIPN that is substantially free of thermoplastic micelles.

Certain embodiments are to methods of producing a resin composition comprising at least one vinyl functional thermoset resin with at least one thermoplastic resin wherein the two resins are sufficiently miscible at a mixing viscosity of at least 5,000 cPs, measured at the temperature of mixing, and when there is sufficient laminar flow through mixing the two resins form an IPN resin and/or a SIPN composition that is substantially free of thermoplastic micelles wherein the resin composition upon curing has a flexural yield stress of greater than 90 MPa, a flexural elongation of greater than 6%, an HDT of between 80 and 120 degrees C., an unnotched Izod strength greater than 3 Joules/cm, a modulus between 2.5 GPa and 3.6 GPa, linear shrinkage less than 1%, and a volume shrinkage less than 3%.

Certain embodiments are to methods of producing a resin composition by mixing at least one vinyl functional thermoset resin with at least one thermoplastic resin wherein the two resins are sufficiently miscible at a mixing viscosity of at least 5,000 cPs, measured at the temperature of mixing, and when there is sufficient laminar flow through mixing the two resins form an IPN resin composition that is substantially free of thermoplastic micelles wherein the resin composition upon curing has one or more of the following properties: a flexural yield stress of greater than 90 MPa, an elongation of greater than 7%, a HDT of between 80 and 110 degrees C., an unnotched Izod strength of greater than 3 Joules/cm, a modulus between 2.5 GPa and 3.6 GPa, a linear shrinkage of less than 1%, and a volume shrinkage of less than 3%.

Certain embodiments are to methods of making a liquid IPN and/or a liquid SIPN by mixing a vinyl functional thermoset resin with a thermoplastic resin wherein the mixture has a viscosity that produces a substantial portion of laminar flow during the mixing.

The embodiments disclosed in the summary are exemplary of some of the embodiments disclosed herein. Other embodiments or combinations of embodiments based on the technology disclosed herein in other portions of the disclosure are also contemplated. The various aspects of the present disclosure may be combined with other aspects of the present disclosure to produce other embodiments.

BRIEF DESCRIPTION OF THE DRAWINGS

For a better understanding of the disclosure, and to show more clearly how it may be carried into effect according to one or more embodiments thereof, reference will now be made, by way of example, to the accompanying figures, in which.

DETAILED DESCRIPTION

The following description is provided in relation to several embodiments that may share common characteristics and features. It is to be understood that one or more features of one embodiment may be combined with one or more features of other embodiments. In addition, a single feature or combination of features in certain of the embodiments may constitute additional embodiments. Specific structural and functional details disclosed herein are not to be interpreted as limiting, but merely as a representative basis for teaching one skilled in the art to variously employ the disclosed embodiments and variations of those embodiments.

The subject headings used in the detailed description are included only for the ease of reference of the reader and should not be used to limit the subject matter found throughout the disclosure or the claims. The subject headings should not be used in construing the scope of the claims or the claim limitations.

The accompanying drawings are not necessarily to scale, and some features may be exaggerated or minimized to show details of particular components.

Certain embodiments are to methods for making interpenetrating polymer network (IPN) compositions and/or pseudo interpenetrating network (SIPN) polymer compositions while still in their liquid state by physically mixing selected thermoset resins and thermoplastics. This is achieved by mixing the liquid mixtures in various mixers in such a manner that the flow in the mixer is predominantly laminar. In certain embodiments, the mixture may have a Reynolds numbers during mixing of below 2,100. Some examples are:

a) Mixing two liquid thermoset resins: these thermosets may differ by having very different molecular weights, having very different reactivities, or combinations thereof in such a way that the molecules sufficiently interpenetrate each other while still in the liquid state.

b) Mixing mixtures of liquid thermoset resins and solutions of thermoplastic resins in such a way that the various molecules sufficiently interpenetrate each other while still in the liquid state.

c) Synthesizing a thermoset resin in a reactor, and after the target molecular weight is reached and the melt starts to cool, add the required amount of a suitable thermoplastic resin. Mix while cooling until the viscosity of the melt builds sufficiently to produce sufficient laminar flow conditions in the reactor and the resin molecules entangle forming a liquid IPN and/or SIPN.

Figure 1:
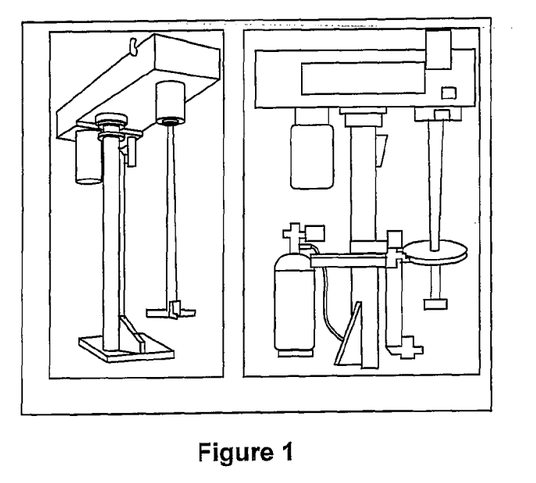
FIG. 1 illustrates a Cowels disperser.
Figure 2:
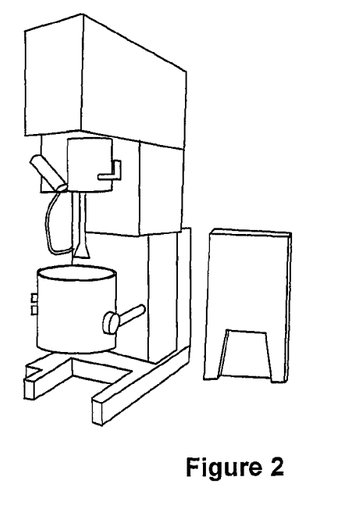
FIG. 2 illustrates a planetary mixer.
Figure 3:
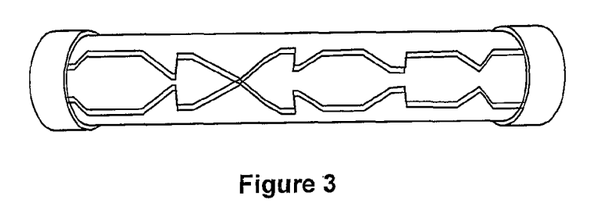
FIG. 3 illustrates a static mixer.
Figure 4:
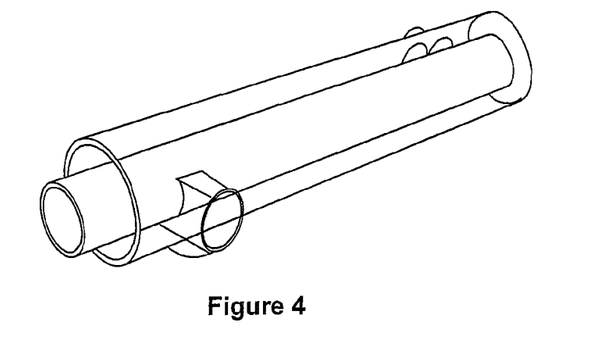
FIG. 4 illustrates a heat exchanger.
Figure 5:
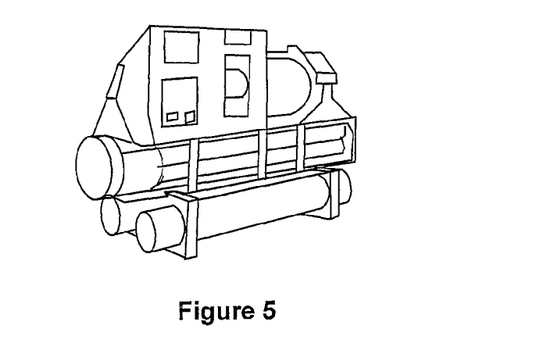
FIG. 5 illustrates a chiller.
Figure 6:
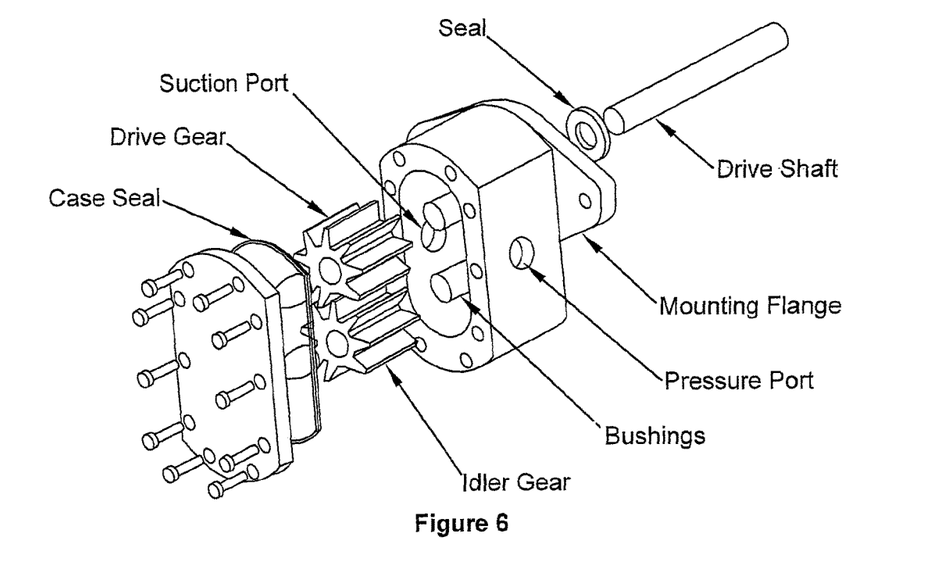
FIG. 6 illustrates a resin process pump.
Figure 7:
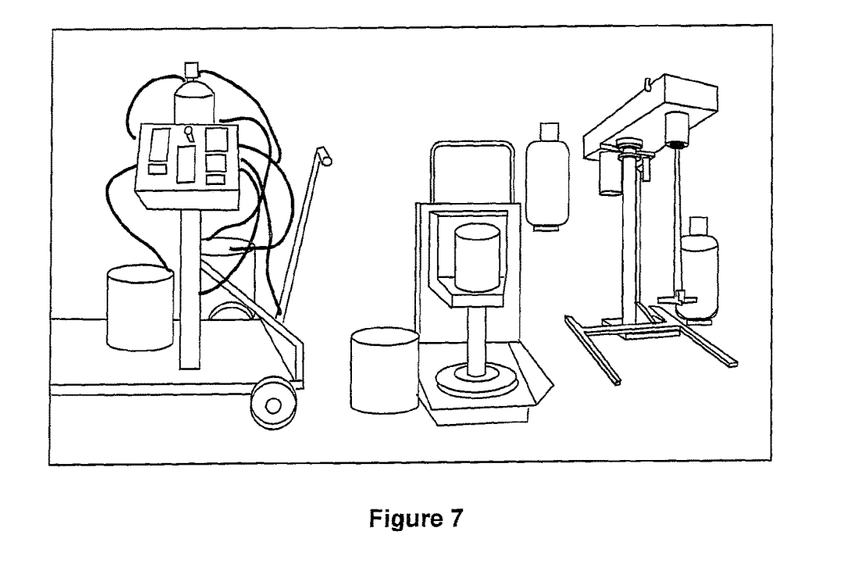
FIG. 7 illustrates a thermoset resin injection pump.
Figure 8:
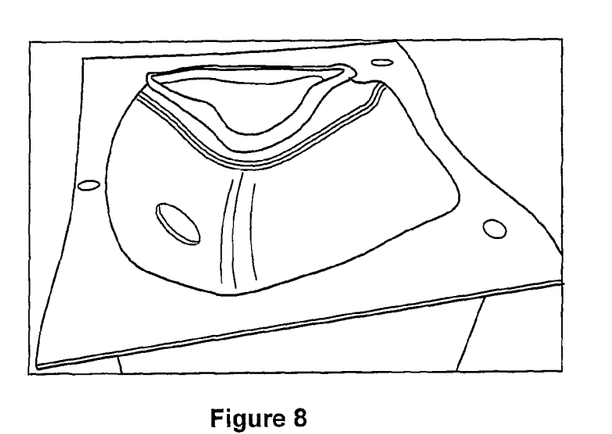
FIG. 8 illustrates a typical thermoset mould.
Figure 9:
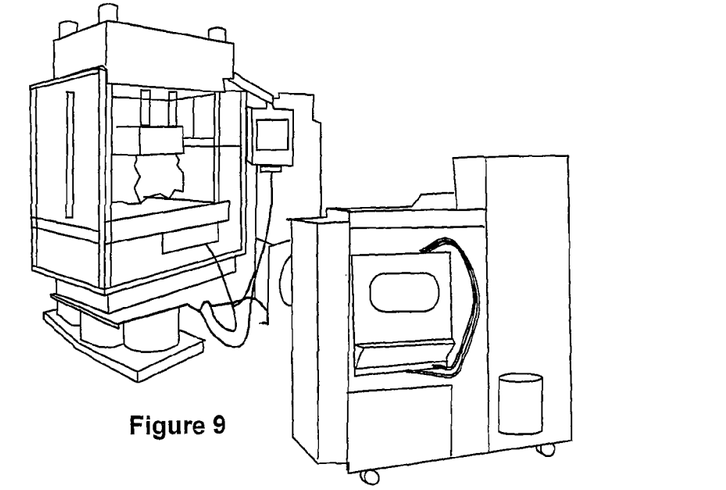
FIG. 9 illustrates a typical thermoplastic injection machine.
Figure 10:
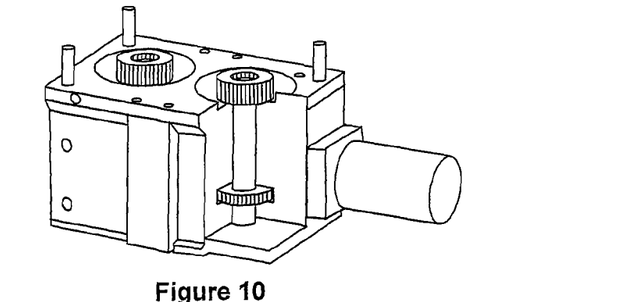
FIG. 10 illustrates a typical thermoplastic mould.

Certain embodiments are to systems for and/or methods of making IPN compositions and/or SIPN polymer compositions by physically mixing a vinyl functional thermoset with a thermoplastic resin solution under laminar flow conditions in the mixer until interpenetration occurs. FIGS. 1, 2 and 3 illustrate exemplary mixers. Sigma arm mixers paddle mixers etc are also suitable because at the working viscosities they are forced to provide laminar flow conditions.

There are certain differences between vinyl functional thermosets and thermoplastic resins. For example, molecular weight, a high molecular weight vinyl functional thermoset would be 5,000 to 6,000 Daltons. A low molecular weight thermoplastic resin would have a molecular weight greater than 10,000 Dalton. A more realistic molecular weight for an engineering thermoplastic would be in the range of 50,000 to 250,000 Daltons. A high molecular weight thermoplastic would approach 1,000,000 Daltons. Thermoplastics are solids at room temperature; thermosets are generally liquids at room temperature because they are typically dissolved in reactive diluents. For vinyl functional thermosets to produce serviceable items of the types contemplated in this disclosure they typically need to undergo a high degree of crosslinking.

With respect to cross-linking density, thermoplastic resins are typically not cross-linked: if they are it is generally a very low crosslinking density compared with thermosets. Thermoplastic resins rely on their high molecular weight and their molecular structure to provide adequate physical properties. Certain design modifications of their molecular structure may allow the thermoplastic manufacturer the ability to control the degree of crystallinity in the plastic molecule.

Free radical cross-linking used with vinyl thermosets typically produces a vitreous solid. However, the stiffer and stronger this solid is the more brittle it becomes. This is one of the reasons the thermoset industry typically modifies these resins with SBR, PU IPNs, Aliphatic PU acrylates, phthalate plasticizers, adipate plasticizers, polyester plasticizers and the like. The tendency of vinyl functional resins to become brittle (Izod impact test) as their yield stress increases is often a problem for the composite industry because it limits the range of vinyl functional thermoset resin applications and is the one of the reasons why they are used in conjunction with fibre reinforcements.

Vinyl Functional Thermosets, and their Uses in the Plastics and Composites Industries In some areas, thermoset moulding has certain advantages over thermoplastic moulding. For example, infrastructure costs; thermoset injection moulding equipment and mould costs are often independent of the volume of resin required per injection. Also the injection equipment is much less expensive. A typical resin injection machine such as a MVP Patriot injector would cost about $12,000 and the average tooling cost for a typical part would vary between $500 for a small, relatively low volume component and $60,000 for a low volume part the size of a small swimming pool. The Patriot pump can deliver any volume from a few ounces to a few tons. On the other hand thermoplastic moulding machines prices go up exponentially with an increase in injection volume. A thermoplastic injection pump capable of shooting 40 lbs would cost in excess of $500,000 and moulds for that capacity are extremely expensive because they have to withstand 3 to 5 tons per square inch pressure and temperatures exceeding 150 C.

The cost of manufacturing moulds for thermoplastics depends on a number factors, ranging from number of cavities, size of the parts (and therefore the size of the mould), complexity of the part, expected tool longevity, surface finishes and others. The initial cost is substantial for thermoplastic injection moulding and compounding these cost issues are:

a) Speed to market: it takes months to get a thermoplastic mould manufactured.

b) Thermoplastic injection technology: Understanding flow in complex thermoplastic moulds is difficult and a specialized process.

c) Prototyping: It is costly to carry out prototyping using thermoplastic injection equipment.

On the other hand, with thermoset resins they can be poured, sprayed, rotocast or injected. For injection moulding relatively inexpensive timber/fibreglass/metallic/plastic/polyethylene or even silicone mould may be used. Thermoset resin systems are therefore suited for prototyping. Moulds can be built in less than a day and a mould can realistically be built and in production in less than a week. Thermoset technology therefore offers a faster and less costly route to market.

As discussed herein, glass fibres may be used in composites to reinforce the resin during gelation and limit shrinkage. If there is minimal shrinkage during gelation and final curing of the resin then glass fibres may not be required to produce a serviceable moulded part, or a reduced amount of glass fibres may be required.

In certain embodiments disclosed herein suitably formulated IPNs and/or SIPNs may have linear shrinkages less than 1%. In certain embodiments, the IPNs and/or SIPNs produced using the methods disclosed herein may have linear shrinkages of between 0.05 to 2%, 0.5 and 1.25%, or 0.5 to 3%. In certain embodiments, the IPNs and/or SIPNs may have linear shrinkages of less than 0.05, 0.5%, 0.7%, 0.8%, 1%, 1.25%, 1.5%, 1.6%, 1.8%, 2% or 3%. This makes the IPNs and/or SIPNs disclosed herein suitable as stand-alone resins (or substantially stand alone resins); for use with fillers and for injection moulding, producing considerably tougher moulded parts than can be produced using other thermoset technologies.

Certain embodiments are directed to methods and/or systems that provide IPNs and/or SIPNs that offers a solution to making commercially feasible and tough serviceable resins.

Producing IPNs and/or SIPNs by Physically Mixing Thermoplastic Resins and Very Low Activity Unsaturated Polyester Resins with Suitable Vinyl Functional Resins There are several approaches available to make IPNs and/or SIPNs by mechanical means, for example:
a) A blend of liquid thermoset resins with substantially different molecular weights can be entangled in their liquid state by mixing them under laminar flow conditions;
b) Physically entangling two dissimilar resins which are in their liquid state, for example an unsaturated polyester resin with a suitable solution of thermoplastic resin by mixing them under suitable laminar flow conditions; and
c) Physically entangling these resins in the reactor before letting down the entangled mixture with reactive diluents.

Except for the specific case of mixing a solid thermoplastic with a thermoset in a reactor at temperature, the thermoplastic may be dissolved in a suitable diluent first to form a solution. One way of dissolving a thermoplastic in a suitable diluent is to mix them in a Cowels disperser or equivalent. In certain embodiments, it may be desirable to maintain as high a thermoplastic content as is practical.

Certain embodiments are directed to methods of producing IPNs and/or SIPNs by raising the viscosity of a suitable vinyl functional thermoset/thermoplastic mixture to between 5,000 cPs and 400,000 cPs and reducing the activity of solvents and with suitable laminar flow conditions during mechanical mixing to cause the two resins to interpenetrate. Laminar flow may be achieved by raising the viscosity of the mixture by either removing diluents or by cooling the mixture to the desired viscosity. Solvent activity can also be reduced by lowering the diluent in the thermoset solution and in the thermoplastic solution or by lowering the mixing temperature or both. One of the reasons for raising the viscosity to above 5,000 cPs is to produce suitable laminar flow in the mixer. Another reason is to reduce the activity of the solvents in the resin mixture. In certain embodiments, this can be done by either reducing the amount of diluents in the mixture and/or reducing the temperature of the mixture to build viscosity.

In certain methods the amount of diluents that are added to a suitable thermoplastic in the reactor may be reduced after producing the vinyl functional resin and before it is let down with reactive diluent/diluents. The hot mixture may be cooled to increase the viscosity while mixing and before letting down.

In certain applications the mixer is selected such that it has sufficient torque to mix the melt as it builds viscosity during cooling. While not wishing to be bound by a particular theory in certain embodiments it is believed that the kneading, stretching, and lamella formation during the mixing processes that naturally occur at high viscosities and/or the reduction in solvent activity and/or the absence of solvent activity during mixing facilitates the formation of IPNs and/or SIPNs.

SIPNs have been made using certain methods disclosed herein with the following vinyl functional thermosets: Vinyl Esters; Unsaturated Polyesters; or Acrylic Functional Thermosets. Combinations of these vinyl functional thermosets, other suitable vinyl functional thermosets or other suitable combinations may also be used in certain embodiments.

The following thermoplastics have been incorporated into at least one of the vinyl functional diluents: Polystyrene; Butadiene Styrene; PMMA/Styrene block copolymers; Polyvinyl Acetate; PVAc copolymers; PMMA; Polycaprolactone; or Polyester resins. Combinations of these thermoplastics, other suitable thermoplastics or other suitable combinations may also be used in certain embodiments. The list of thermoplastics that may be alloyed with vinyl functional thermosets is extensive. There are literally thousands of thermoplastics that may be used to produce IPNs and/or SIPNs using the one or more of the approaches described herein as long as the mixtures have a suitable viscosity and molecular weight.

Other Thermosets

Epoxy resins and/or urethane resins may also be used to form IPNs and/or SIPNs by mixing them with suitable solutions of thermoplastic resins using one or more of the methods and/or systems disclosed herein.

Nature of these IPNs and/or SIPNs

In certain embodiments the IPNs and/or SIPNs made and disclosed herein may not be 100% intercalated interpenetrated. There may also be zones where they have not entangled but these zone sizes are sufficiently small that they do not substantially affect the stability and/or the physical properties of the IPNs and/or SIPNs. In certain embodiments the IPNs and/or SIPNs made and disclosed herein may not be substantially intercalated interpenetrated. There may also be zones where they have not entangled but these zone's sizes are sufficiently small, of the order of the wavelength of visible light, and do not seem to effect the stability or the enhanced physical properties of the SIPN.

In certain formulations, an IPN or SIPN is formed if the yield stress of the base resin is increased, if the elongation of the base resin at rupture is increased, and the mixture is substantially stable and does not chuck.

In certain applications, in order to test to confirm that you have made an IPN and/or SIPN perform one or more of the following checks:
a) The mixture lacks sufficient cloudiness, in other word it is substantially or sufficiently clear.
b) If when light cloudiness and a light source is viewed through the mixture the mixture appears red orange or yellow then the mycells are small enough not to negatively impact on the physical properties when the resin solution is transformed into a solid.
c) There is little phase separation on standing for at least 24 hours. There may be some separation as long as it does not substantially affect the clarity of the bulk of the mixture.
d) When fully cured the mass remains translucent to clear.
e) The viscosity of the IPN and/or SIPN before curing may be substantially higher than that of a mixture of the two components if they are just mixed together normally. The viscosity, depending on the IPN in question will have a viscosity between 2,000 cPs and 18,000 cPs at 25 C.
f) The cured vinyl functional IPN and/or SIPN has one or more enhanced physical properties over the properties of the resin from which it was formulated.

In certain applications, in order to mix a particular thermoplastic with a particular thermoset it may be desirable to cook a low activity thermoset that is compatible with the thermoplastic. One cooks the low activity unsaturated polyester with a ratio of saturated acids to unsaturated 2:1 to 6:1 in a reactor when the desired molecular weight is achieved and the contents of the reactor are beginning the cooling process the thermoplastic is introduced to the melt somewhere between 130° C. and 200° C. depending on the molecular weight and the miscibility of the thermoplastic.

In certain embodiments, when constructed and/or mixed properly at a sufficient viscosity the IPN and/or SIPN may have one or more of the following properties: the mixture will have limited cloudiness and/or it will be substantially clear; there will be little or substantially little phase separation on standing; when fully cured the mass remains substantially clear/transparent; the cured vinyl functional IPN and/or SIPN has/have one or more enhanced physical properties over the properties of the thermoset resin from which it was formulated; or combinations thereof.

In certain embodiments, these IPNs and/or SIPNs may have improved elongation and toughness compared with the vinyl functional resin from which they were made. This may be achieved without substantially lowering (or lowering) the HDT. In certain embodiments, the IPN and/or SIPN produced may have a higher yield stress and/or may have a higher elongation than the resin from which it is made; therefore it requires more energy to break a dimensionally equivalent test piece than an equivalent test piece made from the thermoset resin itself.

Certain embodiments are directed to methods for producing a vinyl functional thermoset SIPN polymer by mixing a vinyl functional thermoset with a thermoplastic resin solution wherein the viscosity of the mixture exceeds 10,000 cPs for certain sufficiently compatible resins. The mixer used ideally may produce laminar flow with stretching and folding to produce lamella. This lamella formation may continue until the lamella is sufficiently thin that diffusion of the resins through each other becomes a significant contributor to mixing. Further stretching and folding may be necessary to orient the molecules to form an IPN and/or SIPN. For less compatible resins it may be necessary to raise the viscosity to as high as, for example, 300,000 cPs or more. These viscosities may also be achieved by further cooling of the mixture, if desired. In certain aspects, the mixing of the vinyl functional thermoset with the thermoplastic resin using one or more of the methods disclosed herein may be further facilitated with the further step of reducing the amount of diluents in the mixture as low as practical so that mechanical mixing still facilitates IPN and/or SIPN formation. In certain aspects, mixing the vinyl functional thermoset using one or more of the methods disclosed herein may be further facilitated by adding the thermoplastic resin to the vinyl functional thermoset in a reactor and mixing prior to letting down the mixture with reactive diluent/diluents. In certain aspects, mixing a vinyl functional resin with a thermoplastic using one or more of the methods disclosed herein may be accomplished by selecting one or more vinyl functional thermosets from the following list: vinyl ester resins, unsaturated polyester resins, acrylic functional resins, methacrylic functional resins, or allylic functional resins. In certain aspects, a method for making an IPN and/or SIPN by mixing a vinyl functional resin with a thermoplastic using one or more of the methods disclosed herein may be accomplished by selecting one or more of the thermoplastic resins from the following: Polystyrene, Polystyrene Butadiene Copolymers, Polystyrene Acrylic Copolymers, Acrylic Polymers, ABS, Polyesters, Polycaprolactone, Polyamides, PVAc, PVAc Copolymers, Cellulose Acetates, PVC, Polysulphones, or Polycarbonates. In certain aspects, a method for making an IPN and/or SIPN by mixing a vinyl functional resin with a thermoplastic using one or more of the methods disclosed herein may be further facilitated wherein the thermoplastic resins are mixed with the thermosets disclosed herein in the following weight percentages of the total weight of the polymers in the IPN and/or SIPNs, around 1%, 2%, 3%, 4%, 5%, 6%, 7%, 8%, 9%, 10%, 11%, 12% 13%, 14%, 15%, 16, 18%, 21%.

Certain embodiments of IPN and/or SPIN resins made by the methods disclosed herein may be used with substantially the same moulds and techniques of moulding that are used with existing VSFPLC moulds and techniques used for moulding polyurethanes. As disclosed in the applications cited and incorporated by reference in their entirety above VSFPLCs are suspensions of very short surface treated, reinforcing fibres in polymerisable resins/thermosets such as, but not limited to, UP resins, vinyl functional resins, epoxy resins, polyurethane resins or combinations thereof.

Certain embodiments of IPN and/or SIPN resins made by the methods disclosed herein may be used with substantially the same moulds and techniques of moulding that are used with existing composites moulds and techniques. The IPNS and/or SIPNs disclosed herein may be used by themselves or in combination with very short fibre types used in composites as disclosed in the earlier applications cited and/or longer glass fibres used in fibre glass fabrication. The fibres selected may be selected from a range of materials, including but not limited to glass, ceramics, naturally occurring glasses, polymers, cellulose, protein based or mineral fibres (such as wollastonite, clay particles, micas), or combinations thereof. In some aspects, the fibres may be chosen from E-, S- or C-class glass, optionally coated with a coupling agent. In certain embodiments, preferred fibres may be E-glass, S-glass, or combinations thereof. The very short fibre polymerisable liquid composites may be selected from the suspensions of very short surface treated, reinforcing fibres in polymerisable resins/thermosets such as, but not limited to, UP resins, vinyl functional resins, epoxy resins, polyurethane resins or combinations thereof disclosed in the cited applications reference above.

Physical Properties

Certain embodiments are to methods and/or systems for producing a resin composition made by mixing at least one vinyl functional thermoset resin with at least one thermoplastic resin wherein the two resins are sufficiently miscible when the mixture has a viscosity during mixing of at least 5000 cPs at the temperature of mixing and the two resins are capable of forming an IPN. In certain embodiments, the viscosity during mixing may be between 5,000 to 300,000 cPs, 10,000 to 1,000,000 cPs, 100,000 to 500,000 cPs, 50,000 to 300,000 cPs, 75,000 to 150,000 cPs, 80,000 to 120,000 cPs, 260,000 to 380,000 cPs, 220,000 to 320,000 cPs, 300,000 to 700,000 cPs, 400,000 to 900,000 cPs, or other suitable ranges at the temperature of mixing and the two resins are capable of forming an IPN and/or SIPN. In certain applications, sufficiently miscible may mean that a mixture of the two resin solutions is substantially clear at the percentages required to produce a serviceable resin blend. In certain applications, sufficient laminar flow is that flow in a mixer which delivers a Reynolds number under 100. In other applications, the Reynolds number may be higher or lower.

Certain embodiments are directed to methods and/or systems for producing a resin composition made by mixing at least one vinyl functional thermoset resin with at least one thermoplastic resin wherein the two resins are sufficiently miscible at the selected mixing viscosity measured at the temperature of mixing and upon sufficient laminar flow mixing the two resins to form an IPN and/or SIPN resin composition that is substantially free of thermoplastic micelles. In certain aspects substantially free of thermoplastic micelles means that no more than 10% of the thermoplastic component is made up of micelles. In certain aspects substantially free of thermoplastic micelles means that no more than 1%, 3%, 5%, 7%, 8%, 10% 11%, 12%, 14%, or 15% of the thermoplastic component is made up of micelles.

It is believed that in certain applications reducing the amount of solvent and solvent activity may minimize the formation of micelles in the SIPNs and/or IPNs.

Certain embodiments are to methods and/or systems for producing a resin made by mixing at least one vinyl functional thermoset resin with at least one thermoplastic resin wherein the two resins are sufficiently miscible at a mixing viscosity of at least 10,000 cPs measured at the temperature of mixing and upon sufficient laminar flow mixing the two resins to form an IPN and/or SIPN resin composition.

In certain aspect the resin compositions disclosed herein are substantially free of micelles. In certain aspect the resin compositions disclosed herein have less than 0.1%, 0.2%, 0.5%, 1%, 2%, 3%, 4%, 5%, or 10% micelles as a percent of the total weight of the thermoplastic resin.

In certain aspect the resin compositions disclosed herein after curing has flexural yield stress of greater than 80 MPa, 90 MPa, 100 MPa 120 MPa, 140 MPa, 150 MPa, or 185 MPa. In certain aspect the resin compositions disclosed herein after curing has flexural yield stress of between 80 MPa to 165 MPa, 90 MPa to 100 MPa, 90 MPa to 140 MPa, 90 MPa to 150 MPa, 110 MPa to 165 MPa, 100 MPa to 150 MPa, or 120 MPa to 190 MPa. In certain aspects the resin compositions disclosed herein after curing have an elongation between 8% to 35%, 6.5% to 35%, 8% to 14%, 10% to 20%, 8% to 25%, 15% to 30%, 20% to 50%, 25% to 60%, or 30% to 65%. In certain aspect the resin compositions disclosed herein after curing have an elongation at least 6.5%, 8% 10%, 14%, 16%, 18%, 20%, 25%, 30%, 40%, 50%, 55%, 60% or 65%, and have HDT between 65 and 125 degrees C. In certain aspects the resin compositions disclosed herein after curing have a HDT between 65 to 125 degrees C., 80 to 100 degrees C., 75 to 105 degrees C., or 90 to 125 degrees C. In certain aspects the resin compositions disclosed herein after curing have a HDT of at least 65, 70, 75, 80, 85, 90, 100, 110, 115, 120, or 125 degrees C. In certain aspects the resin compositions disclosed herein after curing have an unnotched Izod strength greater than 3, 4, 5, 6, 7, or 8 Joules/cm. In certain aspects the resin compositions disclosed herein after curing have an unnotched Izod strength between 3 to 8 Joules/cm, 3 to 5 Joules/cm, 3 to 5 Joules/cm, or 4 to 6 Joules/cm. In certain aspects the resin compositions disclosed herein after curing have a modulus between 1.5 GPa to 3.8 GPa, 2.5 GPa and 3.6 GPa, 2.0 GPa to 3.5 GPa, or 2.4 GPa to 3 GPa. In certain aspects the resin compositions disclosed herein after curing have a modulus of at least 1.5, 1.6, 1.7, 1.8, 1.9, 2, 2.1, 2.2, 2.4, 2.5, 2.6, 2.8, 3, 3.2, 3.5, 3.6, or 3.8 GPa. In certain aspects the resin compositions disclosed herein after curing have linear shrinkages of less than 0.05%, 0.5%, 0.7%, 0.8%, 1%, 1.25%, 1.5%, 1.6%, 1.8%, 2% or 3%. In certain aspects the resin compositions disclosed herein after curing have volume shrinkages less than 0.15%, 1.5%, 2.1%, 2.4%, 3%, 3.75%, 4.5%, 4.8%, 5.4%, 6% or 9%. In certain embodiments, the IPNs and/or SIPNs produced using the methods and/or systems disclosed herein may have one or more of the properties quantified and stated herein as well as various combinations of those quantified and/or enumerated properties.

Figure 11:
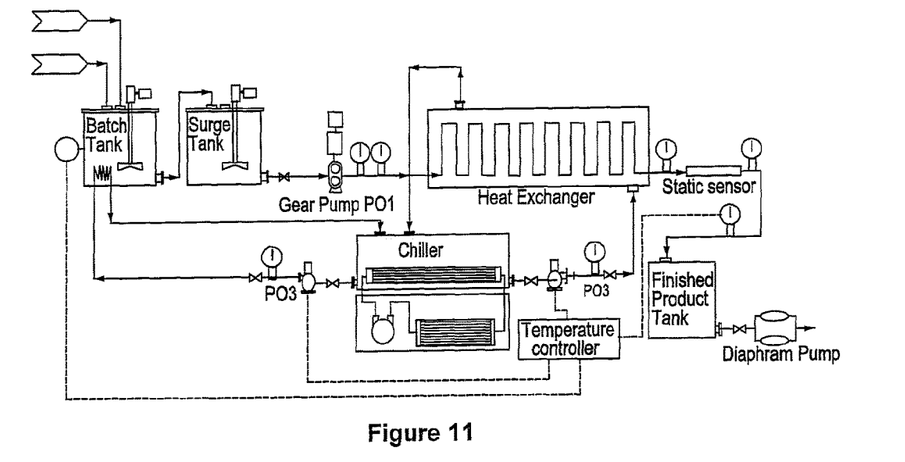
FIG. 11 diagrams a liquid SIPN/IPN production plant schematic, according to certain embodiments.
Figure 12:
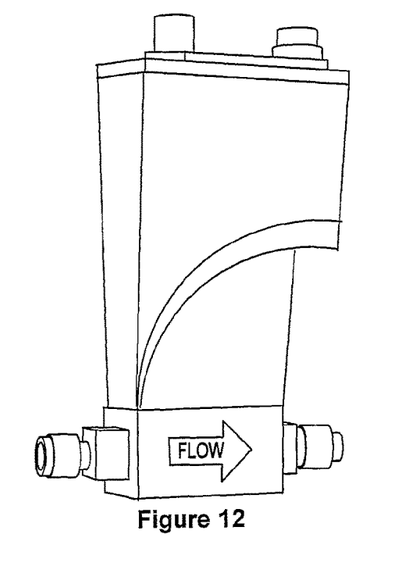
FIG. 12 illustrates a liquid flow controller.

Certain embodiments are directed to methods of manufacturing SIPNs and/or IPN. FIG. 11 shows an exemplary continuous liquid SIPN/IPN production plant schematic. This manufacturing line consists of a preliminary mixing tank, a surge tank, a positive displacement resin pump such as a gear pump or a lobe pump capable of pumping the resin mixture through a heat exchanger/chiller plant at a rate that results in the desired exit temperature range of the static mixer. A flow controller may receive a signal from the outlet of the static mixer which assists in maintaining a predetermined static mixture outlet temperature range. A chiller heat exchanger combination capable of cooling the resin mixture to the desired static mixer exit temperature range is also shown. The length of the static mixer is sufficient to produce a liquid SIPN/IPN at the nominated exit temperature range. Suitable temperature ranges and flow rates ranges may be determined and may be varied depending on the resin mixture. Depending on the SIPN/IPN being manufactured the desired exit temperature range for the liquid SIPN/IPN manufacture may vary between 14° C. for thermoset/polycaprolactone SIPNs/IPNs down to 4° C. for VINNAPAS 8588/thermoset liquid SIPNs/IPNs and even lower exit temperatures for some polystyrene and acrylic thermoplastic thermoset IPNs.

EXEMPLARY METHODS ACCORDING TO CERTAIN EMBODIMENTS

Example 1

To 230 g of 33% styrenated vinyl Ester 40 grams of a 33% solution of PVac was added (concentration of PVac in this solution was 50%). This mixture was mixed in a laboratory mixer at between 2° C. and 7° C. for 15 minutes until the mixture became substantially clear. 0.55% of a 10% solution of Cobalt was added, then 0.3% DMA, then 0.8% BYKA515. This mixture was then blended for 3 minutes. The mixture was left for 14 hours and it did not phase out. A 6 mm sample panel was prepared; the resin was heated to 25° C. and then catalyzed at 2% with MEKP. The following method may be used to produce suitable IPNs and/or SIPNs. Chose a vinyl functional liquid resin from the list below: Unsaturated polyester resins; vinyl ester resins and bisphenyl UP resins; acrylic/methacrylic resins; allylic functional resin.

The lower the monomer content of these resins the better, for example 25% to 30%. Choose a compatible solvent soluble thermoplastic resin, for example Polystyrene. Dissolve this resin in a suitable solvent. Suitable solvents are vinyl functional solvents, the aim being to sufficiently maximize the solids content of the solution. The most common solvent used is styrene monomer. Add the solution of thermoplastic to the vinyl functional resin so that the solids content of the thermoplastic solution represents 1% to 25% of the weight of the vinyl functional resin (preferably between 5 and 7% on a solids basis). Cool the mixture until the viscosity of the mixture of the two resins exceeds 10,000 cPs. In certain applications it may be useful for the viscosity of the mixture to be greater than 100,000 cPs. Blend this mixture until the solution becomes substantial or sufficiently clear. If there is difficulty in mixing the two resins it may be useful to further lower the temperature of the mixer. Any mixer designed to mix viscous liquids is suitable. When the mixture is substantial or sufficiently clear bring it to room temperature and allow it to stand for several days. The mixture should show little signs of separation. If some of the thermoplastic phases out of solution check again to determine if the bulk of the mixture remains substantial or sufficiently clear.

Example 2

In certain embodiments the following method may be used to produce suitable IPNs and/or SIPNs. Some soluble thermoplastics are more difficult to readily mix with thermosets. It may be possible to intercalate these resins by first mixing them in a compatibilizing resin. A compatibilizing resin may be a different soluble thermoplastic resin or thermoset resin. Dissolve the thermoplastic that is more difficult to mix with the thermoset in question in a compatablizing resin that more readily dissolves in a thermoset resin. Then dissolve this solution of thermoplastics into the thermoset adjusting their viscosities to guarantee laminar flow while mixing. Test to make sure that an IPN and/or SIPN has been produced.

Example 3

In certain embodiments the following method may be used to produce suitable IPNs and/or SIPNs. Insoluble thermoplastics and thermoplastics that are difficult to form IPNs and/or SIPNs by some of the other methods disclosed herein may in certain situations be dissolved in a vinyl functional thermoset resin during the resin cooking process. Either they may be dissolved into a compatibilizing resin or directly into the thermoset in question. Either way, in order to limit the interference with the synthesis of the thermoset, it is desirable to add the thermoplastic after the thermoset has reached a suitable optimum molecular weight and during the reactor cooling down process.

Example 4

Polystyrene Thermoplastic Resin/Iso NPG Unsaturated Polyester Resin IPN

The polystyrene was supplied by SIAM Polystyrene Company Limited. The trade name for the product is STYRON. A solution was made by dissolving 33 parts of STYRON in styrene monomer supplied by Nuplex Resins Australia. The Iso NPG was a 33% styrenated UP, trade name GL316 supplied by Nan Ya. Both the thermoplastic resin and the vinyl functional resin were in a liquid state when mixed. They were solutions of resins in reactive diluents. When mixing the thermoplastic and the thermoset resin the viscosity of the mixtures is adjusted so that sufficient laminar flow conditions in the mixture were achieved i.e. the calculated Reynolds Number was below 50. This was done by reducing the temperatures of the mixtures to build adequate viscosities and sufficient laminar flow. As mentioned previously the aim is to intercalate/interpenetrate the resin and the thermoplastic. The aim was to substantially reduce or completely eliminate the formation of mycelles. The interpenetrated resins in solution formed what appeared to be a continuous phase rather than tiny droplets of thermoplastics dispersed in the thermoset resin. The thermoplastic polystyrene was first dissolved in styrene forming a 33% solution of polystyrene in styrene. The weight of polystyrene component of the solution expressed as a % of the vinyl functional thermoset in this case was 7%. The liquid IPN was formulated as follows:
  a) 0.5% of a 10% solution of cobalt
  b) 0.3% DMA
  c) 0.8% BYK A515
  d) These were mixed into the resin solution sequentially using a small Cowels type disperser. The mixture was then vacuumed to remove entrapped air.
  e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hrs.
  f) The panels were conditioned for 24 hours and then tested for flexural strength, flexural elongation and modulus.

Table 1 below illustrates the properties of the IPN after curing. All tests in the table below were carried out in accordance with the relevant ASTM test methods.

TABLE 1

| Resin System | Flex Yield Stress | Flexural Modulus | Flexural Elongation at break | HDT |
|---|---|---|---|---|
| Thermoplastic/Thermoset IPN | 127 MPa | 3.7 GPa | 10.8% | 92° C. |
| Thermoset | 118 MPa | 3.4 GPa | 4% | 85° C. |

Example 5

Paraloid B72 Acrylic Copolymer Thermoplastic/Iso NPG Unsaturated Polyester Resin IPN Paraloid B72 from DOW (ROHM and HASS) was dissolved in styrene monomer at 33%. The Iso NPG was a 33% styrenated UP (trade name GL316 supplied by Nan Ya). When mixing the thermoplastic and the thermoset resin, the viscosity of the mixture was adjusted so that sufficient laminar flow conditions in the mixture were present. This was done by reducing the temperature of the mixtures to build adequate viscosities to ensure sufficient laminar flow conditions. Weight of thermoplastic solid expressed as a % of the vinyl functional thermoset is 5%. The Paraloid B72 acrylic co polymer was first dissolved in styrene to produce a 33% solution, and then added to the Iso NPG resin. The resin blend was mixed with a Cowels disperser at slow speed and at between 4° C. and 10° C. The mixture was allowed to stand for 24 hrs to insure that there was no separation of components.

The resin IPN was then formulated as follows:
  a) 0.5% of a 10% solution of cobalt
  b) 0.3% DMA
  c) 0.8% BYK A515
  d) These were mixed into the resin solution sequentially using a small Cowels type disperser. The mixture was then vacuumed to remove entrapped air.
  e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hrs.
  f) The panels were conditioned for 24 hrs and then tested for flexural strength, flexural elongation, and modulus.

Table 2 below illustrates the properties of the IPN after curing. All tests in the table below were carried out in accordance with the relevant ASTM test methods.

TABLE 2

| Resin System | Flex Yield Stress | Flexural Modulus | Flexural Elongation | HDT |
|---|---|---|---|---|
| Thermoplastic/Thermoset IPN | 124 MPa | 3.3 GPa | 7% | 85° C. |
| Thermoset | 118 MPa | 3.4 GPa | 4% | 85° C. |

Example 6

PMMA Thermoplastic/Iso NPG Unsaturated Polyester Resin IPN

Altuglas BS684 from Arkyma was dissolved in styrene monomer at 33%. The Iso NPG was a 33% styrenated UP trade name GL316 supplied by Nan Ya. When mixing the thermoplastic and the thermoset resin, the viscosity of the mixtures was adjusted so that sufficient laminar flow conditions in the mixture were present. This was done by reducing the temperatures of the mixtures to build adequate viscosities to ensure sufficient laminar flow conditions. Weight of thermoplastic solid expressed as a % of the vinyl functional thermoset was 5%. The Altuglas BS684 acrylic co polymer was first dissolved in styrene to produce a 33% solution, then added to the Iso NPG resin (in this case GL316 resin supplied by Nan Yar). The resin blend was mixed with a Cowels disperser at slow speed and at between 4° C. and 10° C. The mixture was allowed to stand for 24 hrs to insure that there was no separation of components.

The resin IPN was formulated as follows:
a) 0.5% of a 10% solution of cobalt
b) 0.3% DMA
c) 0.8% BYK A515
d) These were mixed into the resin solution sequentially using a small Cowels type disperser. The mixture was then vacuumed to remove entrapped air.
e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hrs.
f) The panels were conditioned for 24 hrs and then tested for flexural strength, flexural elongation, and modulus.

Table 3 below illustrates the properties of the IPN after curing. All tests in the table below were carried out in accordance with the relevant ASTM test methods.

TABLE 3

| Resin System | Flex Yield Stress | Flexural Modulus | Flexural Elongation | HDT |
|---|---|---|---|---|
| Thermoplastic/Thermoset IPN | 125 | 3.5 Gpa | 9% | 88° C. |
| Thermoset | 118 MPa | 3.4 GPa | 4% | 85° C. |

Example 7

Aliphatic Allyl Oligomer(Sartomer CN9101)/GL316 Unsaturated Polyester Resin IPN

Both the thermoplastic resin and the Vinyl functional resins are in a liquid state when mixed. They are solutions of resins in reactive diluents. When mixing the Sartomer CN9101 and the Nan Ya resin the viscosity of the mixtures was adjusted so that laminar flow conditions in the mixture were present. This was done by reducing the temperatures of the mixtures to build adequate viscosities to ensure sufficient laminar flow conditions. In this case the Reynolds number for the mix was below 3. The aliphatic allyl oligomer was added at 20% of the weight of the thermoset. The resin IPN was formulated as follows:
a) 0.5% of a 10% solution of cobalt
b) 0.3% DMA
c) 0.8% BYK A515
d) These were mixed into the resin solution sequentially using a small Cowels type disperser. The mixture was then vacuumed to remove entrapped air.
e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hrs.
f) The panels were conditioned for 24 hours and then tested for flexural strength, flexural elongation, and modulus.

Table 4 below illustrates the properties of the IPN after curing. All tests in the table below were carried out in accordance with the relevant ASTM test methods.

TABLE 4

| Resin System | Flex Yield Stress | Flexural Modulus | Flexural Elongation | HDT |
|---|---|---|---|---|
| Thermoplastic/Thermoset IPN | 120 MPa | 3.2 GPa | 8.85% | 80° C. |
| Thermoset | 118 MPa | 3.4 GPa | 4% | 85° C. |

Example 8

Aliphatic Allyl Oligomer (Sartomer CN9101)/Vinyl Ester Resin/Aliphatic Urethane Acrylate IPN The urethane oligomer modified vinyl ester was Reichhold Dion 9600. Both the aliphatic allyl oligomer and the vinyl functional resins are in a liquid state when mixed. They are solutions of resins in reactive and/or non reactive diluents. When mixing the thermoplastic and the thermoset resin the viscosity of the mixtures is adjusted so that sufficient laminar flow conditions in the mixture are present. This is done by reducing the temperatures of the mixtures to build adequate viscosities to ensure laminar flow conditions. Sartomer C N9101 is a solution of an aliphatic allyl oligomer in a non reactive solvent it was added at 20% of the weight of the thermoset resin.

The resin IPN was formulated as follows:
a) 0.5% of a 10% solution of cobalt
b) 0.3% DMA
c) 0.8% BYK A515
d) These were mixed into the resin solution sequentially using a small Cowels type disperser. The mixture was then vacuumed to remove entrapped air.
e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hrs.
f) The panels were conditioned for 24 hrs and then tested for flexural strength, flexural elongation, and modulus.

Table 5 below illustrates the properties of the IPN after curing. All tests in the table below were carried out in accordance with the relevant ASTM test methods.

TABLE 5

| Resin System | Flex Yield Stress | Flexural Modulus | Flexural Elongation | HDT |
|---|---|---|---|---|
| Thermoplastic/Thermoset IPN | 103 MPa | 2.5 GPa | Did not break | 85° C. |
| Thermoset | 106 MPa | 2.6 GPa | 9.8% | 95° C. |

Example 9

Wacker PVac Vinnapas 501 Thermoplastic/Vinyl Ester AOC VIPEL F010BNT IPN

Both the thermoplastic resin and the vinyl functional resins are in a liquid state when mixed. They are solutions of resins in reactive diluents. The thermoplastic resin is a solid dissolved in the liquid thermoset resin in a reactor at high temperature. When mixing the thermoplastic and the thermoset resin the viscosity of the mixtures is adjusted so that sufficient laminar flow conditions in the mixture are present. This is done by reducing the temperatures of the mixtures in the reactor to build adequate viscosities to ensure sufficient laminar flow conditions are present. The weight of the thermoplastic solid expressed as a % of the vinyl functional thermoset was 3% approximately. The compatibilizing thermoset that the thermoplastic was ultimately dissolved in was a CHDA HPHP Dipropylene glycol fumarate cooked to an acid value of approximately 30 mg of KOH/gram. The resin was formulated as follows:

a) 0.5% of a 10% solution of cobalt
b) 0.3% DMA
c) 0.8% BYK A515
d) These were mixed into the resin solution sequentially using a small Cowels type disperser. The mixture was then vacuumed to remove entrapped air.
e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hrs.
f) The panels were conditioned for 24 hrs and then tested for flexural strength, flexural elongation, and modulus.

Table 6 below illustrates the properties of the IPN after curing. All tests in the table below were carried out in accordance with the relevant ASTM test methods.

TABLE 6

| Resin System | Flex Yield Stress | Flexural Modulus | Flexural Elongation | HDT |
|---|---|---|---|---|
| Thermoplastic/Thermoset IPN | 145 MPa | 3.5 GPa | 9.3% | 102° C. |
| Thermoset | 132 MPa | 3.3 GPa | 6% | 100° C. |

Example 10

WACKER PVac Copolymer Vinnapas 8588 Thermoplastic/AOC VIPEL F010BNT Vinyl Ester IPN Both the thermoplastic resin and the vinyl functional resins are in a liquid state when mixed. They are solutions of resins in reactive and/or non reactive diluents. When mixing the thermoplastic and the thermoset resin the viscosity of the mixtures is adjusted so that only laminar flow conditions in the mixture are present. This is done by reducing the temperatures of the mixtures to build adequate viscosities to guarantee laminar flow. The Vinnapas 8588 solution was prepared by dissolving 60 parts Vinnapas in 40 parts styrene under laminar flow conditions. Weight of thermoplastic solid expressed as a % of the vinyl functional thermoset was 5%. The resin was formulated as follows:

a) 0.5% of a 10% solution of cobalt
b) 0.3% DMA
c) 0.8% BYK A515
d) These were mixed into the resin solution sequentially using a small Cowels type disperser. The mixture was then vacuumed to remove entrapped air.
e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hrs.
f) The panels were conditioned for 24 hrs and then tested for flexural strength, flexural elongation, and modulus.

Table 7 below illustrates the properties of the IPN after curing. All tests in the table below were carried out in accordance with the relevant ASTM test methods.

TABLE 7

| Resin System | Flex Yield Stress | Flexural Modulus | Flexural Elongation | HDT |
|---|---|---|---|---|
| Thermoplastic/Thermoset IPN | 138 MPa | 3.5 GPa | 9% | 93° C. |
| Thermoset | 123 MPa | 3.1 GPa | 6.6% | 99° C. |

Example 11

Low Activity UP Blend/Ashland Vinyl Functional Acrylic Resin (Modar 816) IPN

Both the thermoplastic and the vinyl functional resins were in a liquid state when mixed. They were solutions of resins in reactive diluents. The thermoplastic resin is a low reactivity thermoset a transitional state intermediate between a thermoplastic and a thermoset which is made by MIRteq Pty Ltd as a specialized non aromatic reactive plasticizer to be used in low smoke resin formulations. When mixing the "thermoplastic-thermoset" and the acrylic resin the viscosity of the mixtures was adjusted so that sufficient laminar flow conditions in the mixture were present to allow the resins to intercalated/interpenetrate. During mixing the viscosity of the resin in the mixer was between 15,000 and 20,000 cPs. This was achieved by refrigerating the contents of the mixer to reduce the temperatures of the mixtures below 12° C. in order to build adequate viscosities and ensure sufficient laminar flow conditions. The weight of thermoplastic/thermoset expressed as a % of the vinyl functional thermoset was 10%. The resin was formulated as follows:

a) 0.5% of a 10% solution of cobalt
b) 0.3% DMA
c) 0.8% BYK A515
d) These were mixed into the resin solution sequentially using a small Cowels type disperser. The mixture was then vacuumed to remove entrapped air.
e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hrs.
f) The panels were conditioned for 24 hrs and then tested for flexural strength, flexural elongation, and modulus.

Table 8 below illustrates the properties of the IPN after curing. All tests in the table below were carried out in accordance with the relevant ASTM test methods.

TABLE 8

| Resin System | Flex Yield Stress | Flexural Modulus | Flexural Elongation | HDT |
|---|---|---|---|---|
| Thermoplastic/Thermoset IPN | 118 MPa | 3.1 GPa | 7.8% | 84° C. |
| Thermoset | 117 MPa | 3.3 GPa | 4.5% | 83° C. |

Example 12

Aliphatic Allyl Oligomer (Sartomer CN9101)/Vinyl Functional Acrylic Resin (Modar 816) IPN Both the aliphatic allyl oligomer and the vinyl functional resins are in a liquid state when mixed. When mixing the allyl oligomer and the acrylic resin, the viscosity of the mixtures was adjusted so that sufficient laminar flow conditions in the mixture were present. This was done by reducing the temperatures of the mixtures to build adequate viscosities. The weight of oligomer added to the acrylic resin was 20% on a weight basis. The IPN resin mixture was formulated as follows:

a) 0.5% of a 10% solution of cobalt
b) 0.3% DMA
c) 0.8% BYK A515
d) These were mixed into the resin solution sequentially using a small Cowels type disperser. The mixture was then vacuumed to remove entrapped air.
e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hours.
f) The panels were conditioned for 24 hours and then tested for flexural strength, flexural elongation, and modulus.

Table 9 below illustrates the properties of the IPN after curing. All tests in the table below were carried out in accordance with the relevant ASTM test methods.

TABLE 9

| Resin System | Flex Yield Stress | Flexural Modulus | Flexural Elongation | HDT |
| --- | --- | --- | --- | --- |
| Thermoplastic/Thermoset IPN | 115 MPa | 3.2 GPa | 10.7% | 80° C. |
| Thermoset | 117 MPa | 3.3 GPa | 4.5% | 83° C. |

Example 13

Perstorp Capa 6800: Polycaprolactone Thermoplastic/AOC VIPEL F010 BNT VE Resin IPN Both the thermoplastic resin and the vinyl functional resins were in a liquid state when mixed. They were solutions of resins in reactive diluents. 33% polycaprolactone was dissolved in styrene using a Cowels type disperser. This liquid IPN was manufactured in a prototype continuous production IPN plant. The resin mixture was cooled to 14 C which produced an adequate viscosity to ensure sufficient laminar flow conditions were present. The liquid IPN was then left to stand for 14 hours to ensure that the IPN was stable. That is, there was no chucking out of the thermoplastic during that time. The weight of thermoplastic solid expressed as a % of the vinyl functional thermoset was 6%.

The above resin was formulated as follows:
a) 0.5% of a 10% solution of cobalt
b) 0.3% DMA
c) 0.8% BYK A515
d) These were mixed into the resin solution sequentially using a small Cowels type disperser. The mixture was then vacuumed to remove entrapped air.
e) 6 mm thick test panels were prepared by catalyzing the formulated resin solution with 2% MEKP initiator and poured into a sample. The panels were cured in the lab at 25° C. for at least 12 hrs and then post cured at 80° C. for 2 hrs.
f) The panels were conditioned for 24 hrs and then tested for flexural strength, flexural elongation, and modulus.

Table 10 below illustrates the properties of the IPN after curing. All tests in the table below were carried out in accordance with the relevant ASTM test methods.

TABLE 10

| Resin System | Flex Yield Stress | Flexural Modulus | Flexural Elongation | HDT |
| --- | --- | --- | --- | --- |
| Thermoplastic/Thermoset IPN | 120 MPa | 3.0 GPa | 13% | 95° C. |
| Thermoset | 132 MPa | 3.3 GPa | 6% | 100° C. |

Example 14

Perstorp CAPA 6800 Polycaprolactone Thermoplastic/Aliphatic Low Smoke Unsaturated Polyester Resin Both the thermoplastic polycaprolactone and the aliphatic unsaturated polyester resin were in a liquid state when mixed. The aliphatic unsaturated polyester was made from 2 moles of 1,4CHDA, 2 moles of adipic acid, 3 moles of maleic anhydride, 3 moles of HPHP diol, 2.3 moles of MPDiol, and 2 moles of dipropyline glycol. When mixing the thermoplastic polycaprolactone and the thermoset resin the viscosity of the mixtures is adjusted so that sufficient laminar flow conditions in the mixture were present. This was done by reducing the temperatures of the mixtures to build adequate viscosities to ensure sufficient laminar flow conditions were present. The polycaprolactone was dissolved in styrene forming a 33% solution of the thermoplastic before being added to the unsaturated polyester. The resultant liquid IPN was formulated as follows:

a) 0.5% of a 10% solution of cobalt
b) 0.3% DMA
c) 0.8% BYK A515
d) These were mixed into the resin solution sequentially using a small Cowels type disperser. The mixture was then vacuumed to remove entrapped air.
e) 6 mm thick test panels were prepared by catalyzing the formulated resin solution with 2% MEKP initiator and poured into a sample. The panels were cured in the lab at 25° C. for at least 12 hours and then post cured at 80° C. for 2 hrs.
f) The panels were conditioned for 24 hours and then tested for flexural strength, flexural elongation, and modulus.

Table 11 below illustrates the properties of the IPN after curing. All tests in the table below were carried out in accordance with the relevant ASTM test methods.

TABLE 11

| Resin System | Flex Yield Stress | Flexural Modulus | Flexural Elongation | HDT |
| --- | --- | --- | --- | --- |
| Thermoplastic/Thermoset IPN | 90 MPa | 2.5 GPa | Did not break | 70° C. |
| Thermoset | 93 MPa | 2.6 GPa | 6.4% | 75° C. |

Example 15

Epoxy Resins and Urethane Resins can Also Form SIPNs by Mixing them with Suitable Thermoplastic Resins Using One or More of the Methods Mentioned Herein.

While the present disclosure has been described in connection with certain embodiments, it is to be understood that the present disclosure is not to be limited to the disclosed embodiments, but on the contrary, is intended to cover various modifications and equivalent arrangements. Also, the various embodiments described herein may be implemented in conjunction with other embodiments, e.g., aspects of one embodiment may be combined with aspects of another embodiment to realize yet other embodiments. Further, each independent feature or component of any given embodiment may constitute an additional embodiment.

The invention claimed is:

1. A method of producing a pseudo interpenetrating network (SIPN) composition or an interpenetrating polymer network (IPN) composition, comprising:
   physical alloy mixing of at least one vinyl functional thermoset resin with at least one thermoplastic resin; wherein the two resins are miscible when the mixture has a viscosity during mixing of at least 10,000 cPs measured at the temperature of mixing, and wherein the mixture has a Reynolds number during mixing that is below 2100.

2. The method of claim 1, wherein the two resins are sufficiently miscible when the mixture has a viscosity during mixing of at least 5000 cPs at the temperature of mixing and the two resins are capable of forming a SIPN or an IPN while still in the liquid state.

3. The method of claim 1, wherein the two resins are sufficiently miscible at a mixing viscosity of at least 5,000 cPs measured at the temperature of mixing and the mixing results in sufficient laminar flow such that a substantial portion of the resin mixture forms an IPN or a SIPN while still in the liquid state.

4. The method of claim 1, wherein the two resins are sufficiently miscible at a mixing viscosity of at least 5,000 cPs measured at the temperature of mixing and upon sufficient laminar flow mixing the two resins form an IPN or a SIPN resin composition while still in the liquid state that is substantially free of thermoplastic micelles.

5. The method of claim 4, wherein the SIPN composition or IPN composition is cured, and upon curing comprises one or more of:
   i) a flexural yield stress greater than 45 MPa;
   ii) an elongation in the range of between 6.5% to 35%;
   iii) a HDT in the range of between 65 and 125° C.;
   iv) an unnotched Izod strength of greater than 3 Joules/cm;
   v) a modulus in the range of between 1.5 GPa and 3.8 GPa;
   vi) a linear shrinkage less than 2%; or
   vii) a volume shrinkage of less than 6%.

6. The method of claim 4, wherein the SIPN composition or IPN composition is cured, and upon curing comprises:
   i) a flexural yield stress greater than 45 MPa;
   ii) an elongation in the range of between 6.5% to 35%;
   iii) a HDT in the range of between 65 and 125° C.;
   iv) an unnotched Izod strength of greater than 3 Joules/cm;
   v) a modulus in the range of between 1.5 GPa and 3.8 GPa;
   vi) a linear shrinkage less than 2%; and
   vii) a volume shrinkage of less than 6%.

7. The method of claim 1, wherein the mixture has a viscosity that produces a substantial portion of laminar flow during the mixing.

8. The method of claim 1, wherein the Reynolds number in the mixer during mixing of the resin composition is below 2000.

9. A method of producing a moulded product comprising:
   a) selecting at least one liquid IPN or SIPN resin composition produced according to the method of claim 1;
   b) catalyzing the IPN or SIPN with at least one catalyzing agent; and
   c) pouring or pumping the resin composition into a mould and allowing it to cure.

10. A continuous liquid interpenetrating polymer network (IPN) production process, comprising:
    pumping a resin mixture through a heat exchanger/chiller plant and static mixer configuration of sufficient length to produce laminar flow for the creation of a liquid IPN at a predetermined exit temperature of about 14° C. for thermoset/polycaprolactone IPNs of about 4° C. for VINNAPAS 8588/thermoset liquid IPNs, and exit temperatures lower than 4° C. for some higher molecular weight polystyrene and acrylic thermoplastic thermoset IPNs.

11. The method of claim 1, wherein the method further comprises dissolving the at least one thermoplastic resin is dissolved in a chlorinated solvent selected from one or more of the following: trichloroethane, dichloroethane, and carbon tetrachloride, and then mixing the solution with the at least one vinyl functional thermoset resin.

12. The method of claim 11, wherein the at least one vinyl functional thermoset resin is a liquid vinyl functional thermoset.

13. The method of claim 12, wherein the at least one thermoplastic resin is 10% to 30% PMMA, relative to the total weight of polymers in the SIPN composition or IPN composition.

14. The method of claim 12, wherein the at least one thermoplastic resin is 10% to 30% polystyrene, relative to the total weight of polymers in the SIPN composition or IPN composition.

15. The method of claim 14, wherein the temperature is held at between 18° C. to 22° C. when mixing the solution with the at least one liquid vinyl functional thermoset resin.

16. The method of claim 12, wherein the at least one thermoplastic resin is 10% to 30% of at least one soluble thermoplastic, relative to the total weight of polymers in the SIPN composition or IPN composition.

17. The method of claim 16, wherein the temperature is held at between 18° C. to 22° C. when mixing the solution with the at least one liquid vinyl functional thermoset resin.

18. The method of claim 12, wherein the at least one thermoplastic resin is 10% to 30% ABS, relative to the total weight of polymers in the SIPN composition or IPN composition.

19. The method of claim 18, wherein the temperature is held at between 18° C. to 22° C. when mixing the solution with the at least one liquid vinyl functional thermoset resin.

* * * * *